US006748224B1

(12) United States Patent
Chen et al.

(10) Patent No.: US 6,748,224 B1
(45) Date of Patent: Jun. 8, 2004

(54) LOCAL POSITIONING SYSTEM

(75) Inventors: Byron H. Chen, Whippany, NJ (US); Maria E. Palamara, Denville, NJ (US); Charles Varvaro, Glendale Heights, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/212,261

(22) Filed: Dec. 16, 1998

(51) Int. Cl.[7] ................................. H04Q 7/20
(52) U.S. Cl. ..................... 455/456.1; 342/451; 342/458
(58) Field of Search ................................ 455/456, 457, 455/456.1–456.6; 342/450, 451, 457, 387, 458

(56) References Cited

U.S. PATENT DOCUMENTS

| 5,058,200 A | 10/1991 | Huang et al. ................. 455/33 |
| 5,646,632 A | 7/1997 | Khan et al. ................. 342/375 |
| 6,208,297 B1 * | 3/2001 | Fattouche et al. .......... 342/450 |

FOREIGN PATENT DOCUMENTS

| JP | 7-181242 | 7/1995 |
| JP | 9-15314 | 1/1997 |
| JP | 10-48322 | 2/1998 |
| JP | 10-322752 | 12/1998 |
| WO | WO 98/47019 | 10/1998 |
| WO | WO 98/48294 | 10/1998 |
| WO | WO 98/48578 | 10/1998 |

OTHER PUBLICATIONS

J.J. Caffery Jr. et al., "Overview of Radiolocation in CDMA Cellular Systems", IEEE Communications Magazine, IEEE Service Center, Piscataway, NJ, US, vol. 36, No. 4, Apr. 1, 1998pp 38–45.
EPO Search Report dated Feb. 1, 2002.

* cited by examiner

Primary Examiner—Charles Appiah
Assistant Examiner—J Moore

(57) ABSTRACT

A local positioning system (LPS) uses the radio propagation parameters in a CDMA forward link or TDMA reverse link to establish a mobile station's position. The mobile station receives pilot channel signals from at least three distinct base stations and records the PN chip offset of the pilot channel signals. The LPS time difference of arrival triangulation approach requires no additional signal detection capabilities. Base stations send out pilot channel signals that arrive at a mobile station with a particular phase and at least a predetermined minimum strength. The mobile station reports back the "visible" pilot channel signals, their phases and signal strength to the LPS which uses a location nonlinear system, expressed as a set of cost functions, to estimate the mobile location. The LPS can also solve the 9-1-1 mobile location problem for wireless CDMA systems by determining the position of a person in distress that has a digital cellular phone.

25 Claims, 3 Drawing Sheets

LOCAL POSITIONING SYSTEM

BACKGROUND OF THE INVENTION

I. Field of the Invention

The present invention relates to determining the position of a mobile station; more specifically, to locating a mobile station using time difference of arrival (TDOA).

II. Description of the Related Art

A global positioning system (GPS) is commonly used to provide a receiver with accurate measurements of its location. The GPS receiver receives a signal from satellites and determines its positions by performing TDOA calculations based on the known position of the satellites. The receiver is generally attached to a vehicle or boat and is provided for this single purpose. The expense of the GPS receivers has generally limited its purchasers to luxury vehicle, aircraft, and boat owners.

Digital cellular/PCS phones have become a very convenient and inexpensive way for a person to communicate with other persons or communication systems from wherever the person is located. The person can also call 9-1-1 in the event of an emergency. However, to date, wireless communication systems can not accurately determine the location of the caller without the use of satellites and GPS.

Current wireless communication systems use multiple access techniques to combine signals from different sources to permit many users to share a common medium without mutual interference. One of the basic types of multiple access techniques is code division multiple access (CDMA). In CDMA, each base station transmits a pilot channel signal, which is essentially an unmodulated pseudo-random noise (PN) sequence. The PN sequence comprises a sequence of PN chips, and each PN chip corresponds to a distance of about 800.4 feet. Each base station transmits the pilot channel signal using a different timing offset such that mobile stations can distinguish from which base station a pilot channel signal was transmitted.

The mobile station is time synchronized with a serving base station, i.e., the base station in which the mobile station is in communication. The mobile searches time intervals referred to as search windows for the pilot channel signals. Each base station is configured to transmit its pilot channel signal such that mobile stations can expect to begin receiving no more than one pilot channel signal within each search window. When the mobile station detects a pilot channel signal, it measures the pilot channel signal strength and records the phase of the pilot channel signal, in terms of PN chips, as the pilot channel signal arrives at the mobile station. If the pilot channel signal strength exceeds a predetermined threshold, then the base station that transmitted the pilot channel signal is "visible" to the mobile station. The measurements and recordings are transmitted from the mobile station to the serving base station or some other predetermined location over a reverse link.

Conventional methods of determining a mobile station's geolocation generally require an indication of distances between at least three "visible" base stations and the mobile station. The distance between a base station and a mobile station is equal to the time $\Delta t_i$ for a signal to travel from the base station to the mobile station, multiplied by a wave speed $\upsilon$ of the signal. If $\Delta t_1 \upsilon$ is a distance from the mobile station (having geographic coordinates $(x_0, y_0)$) to a first base station (having known geographic coordinates $(x_1, y_1)$), $\Delta t_2 \upsilon$ is a distance from the mobile station to a second base station (having known geographic coordinates $(x_2, y_2)$), and $\Delta t_3 \upsilon$ is a distance from the mobile station to a third base station (having known geographic coordinates $(x_3, y_3)$), then based on the Pythagorean theorem, the following equations can be derived for a time of arrival (TOA) approach:

$$\Delta t_1 v = \sqrt{(x_1 - x_0)^2 + (y_1 - y_0)^2}, \quad (1)$$

$$\Delta t_2 v = \sqrt{(x_2 - x_0)^2 + (y_2 - y_0)^2}, \quad (2)$$

$$\Delta t_3 v = \sqrt{(x_3 - x_0)^2 + (y_3 - y_0)^2}, \quad (3)$$

to determine the mobile position $(x_0, y_0)$. However, in CDMA, the time $\Delta t_i$ is unknown because mobile stations have no absolute time reference to measure $\Delta t_i$.

A TDOA approach reduces the number of equations from three to two (equation (3) minus equation (1) and equation (2) minus equation (1)). The TDOA approach provides accurate location determinations if no system measurement errors or multi-path effects, described below, are present. Unfortunately, system measurement errors and multi-path effects generally exist and cause deviations from true location determinations. Therefore the above equations cannot be used directly to accurately determine the mobile station M's geolocation.

SUMMARY OF THE INVENTION

The present invention addresses these problems by providing a local positioning system (LPS) designed to use radio propagation parameters in code-division multiple access (CDMA) forward links or time-division multiple access (TDMA) reverse links to estimate a mobile station's position.

The LPS determines the position of the mobile using triangulation methods by minimizing two set of equations, called cost functions. The first set of cost functions represent distance errors from the "visible" base stations to the mobile station, and the second set of cost functions represents position errors in the location estimation of the mobile station. Both sets of cost functions include variables common to more than one of the cost functions within the set. The cost functions are minimized by estimating values for the unknown variables within each equation so that the distance or position errors in the set are as close to zero as possible.

To determine the geographical coordinates of a mobile station when the distances between the mobile station and the base stations are not known, the LPS first estimates the distance from the mobile station to the base stations to mitigate the system measurement errors and multi-path effect. After the distances are estimated, the LPS estimates the geographic coordinates of the mobile station $(x_0, y_0)$, based on the estimated distances.

In a preferred embodiment, the LPS is a software implementation on a computer to determine the geographic location (geolocation) of a mobile station. The LPS receives a data sample including information indicating arrival times of pilot channel signals at a mobile station and accesses base station information indicating the location of at least three cellular or PCS base stations to which the arrival time information is associated. The LPS then estimates the distances from the mobile station to the base stations by minimizing a first set of equations or cost functions and estimates the geolocation of the mobile station by minimizing a second set of equations or cost functions based on the estimated distances.

The LPS of the present invention provides the benefit of using existing equipment to provide GPS-like positioning capabilities. The LPS requires no additional signal detection capabilities, and only requires a minor modification to the existing wireless telephone systems. No additional hardware is needed other than the standard CDMA/TDMA system, making the LPS cost effective. The LPS can also solve the 9-1-1 mobile location problem for wireless CDMA/TDMA systems. Therefore, the LPS can determine the position of a person in distress from their digital phone.

BRIEF DESCRIPTION OF THE DRAWINGS

The invention will be described in detail with reference to the following drawings, wherein like numerals represent like elements and.

DETAILED DESCRIPTION OF THE INVENTION

The embodiments described herein are used in a CDMA forward link triangulation (FLT) system. It is understood that the embodiments are also applicable to a TDMA reverse link triangulation (RLT) system upon synchronization of the base stations.

The LPS determines the geographic coordinates of the mobile station by receiving a data sample representing information regarding the mobile station, accessing base station information regarding at least three base stations, and estimating the location of the mobile station. The LPS determines the location of the mobile station by minimizing a first set of equations or cost functions to estimate the distances between the mobile station and base stations based on the data sample and the base station information, and then minimizing a second set of equations or cost functions to estimate the geographic coordinates of the mobile station.

The LPS is based on TDOA which uses measured phase shift or chip offset information of the pilot channel signals transmitted from particular base stations that are "visible" to the mobile station. A TDOA triangulation approach requires time or propagation delay measurements from at least three "visible" base stations. If less than three base stations are "visible" to the mobile station, then the LPS will wait for a mobile station report of three "visible" base stations or adjust signal strength threshold levels to allow the mobile to recognize more pilot channel signals from other base stations. The mobile station frequently measures the pilot channel signal phases so that the location estimation can be accrued and made more precise over time.

Figure 1:
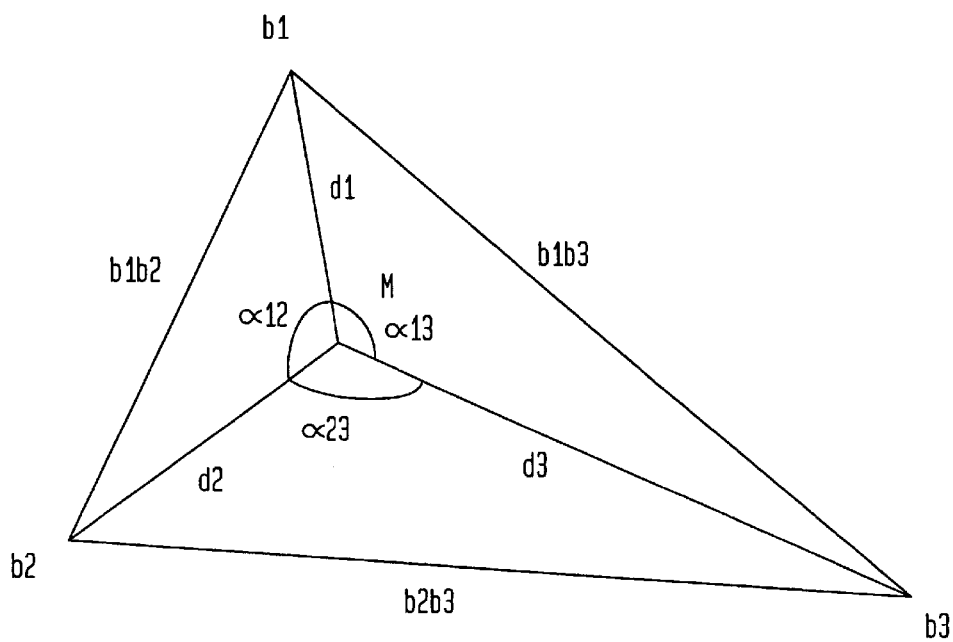
FIG. 1 illustrates a mobile station located inside of a triangle formed by three distinct base stations.
Figure 2:
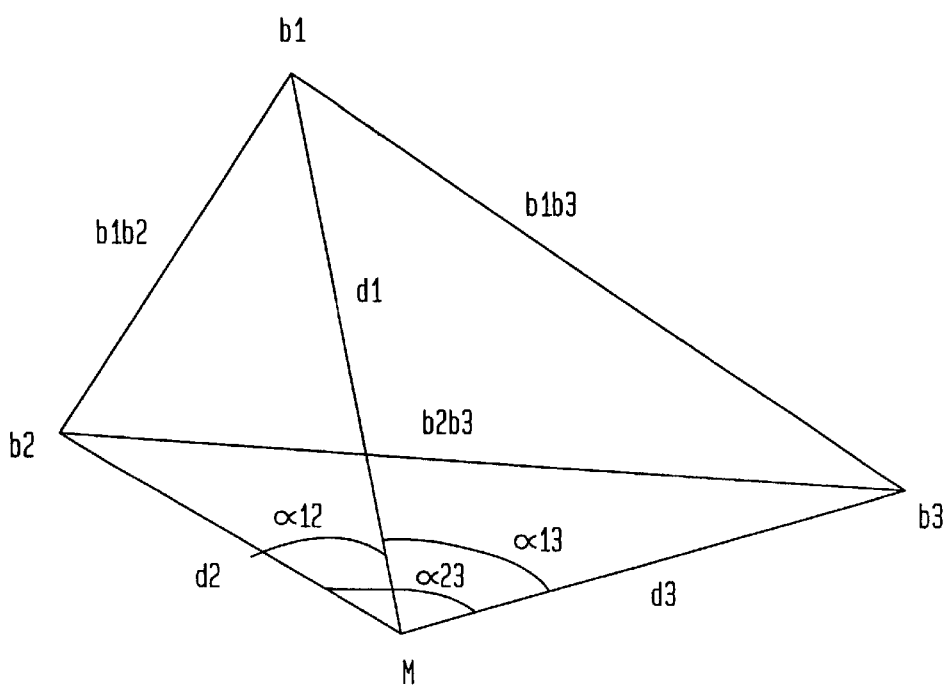
FIG. 2 illustrates a mobile station located outside of a triangle formed by three distinct base stations.

FIG. 1 shows a point representing mobile station M located inside a triangle of points representing "visible" base stations $b_1$, $b_2$ and $b_3$ at respective distances $d_1$, $d_2$ and $d_3$ from the mobile station M. The distances between the base stations are measured as: length $b_1b_2$ between base stations $b_1$ and $b_2$; length $b_1b_3$ between base stations $b_1$, and $b_3$; and length $b_2b_3$ between base stations $b_2$ and $b_3$. Angles $\alpha_{12}$, $\alpha_{13}$ and $\alpha_{23}$ are formed by arcs $b_1Mb_2$, $b_1Mb_3$ and $b_2Mb_3$, respectively. In FIG. 1, angle $\alpha_{23}$ is equal to 360 degrees minus angles $\alpha_{12}$, and $\alpha_{13}$. FIG. 2 is similar to FIG. 1 except mobile station M is located outside triangle $b_1b_2b_3$ and angle $\alpha_{23}$ is equal to angles $\alpha_{12}$ plus $\alpha_{13}$.

Figure 3A:
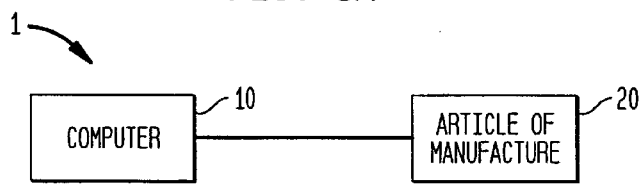
FIG. 3a is a schematic perspective view of the LPS implementation according to a preferred embodiment of the invention.

FIG. 3a illustrates a diagram of an LPS implementation. The LPS includes a computer 10 and an article of manufacture 20 and may be located at one of the base stations. The article of manufacture 20 includes a computer-readable medium and an executable program for locating the mobile station M.

Figure 3B:
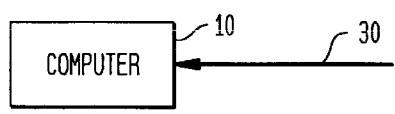
FIG. 3b is a schematic perspective view of the LPS implementation according to another preferred embodiment of the invention.

FIG. 3b illustrates an alternative LPS implementation. The LPS 1 includes the computer 10 for receiving a signal 30 carrying the executable program for locating the mobile station M. The signal 30 is transmitted in a digital format either with or without a carrier wave.

Figure 4:
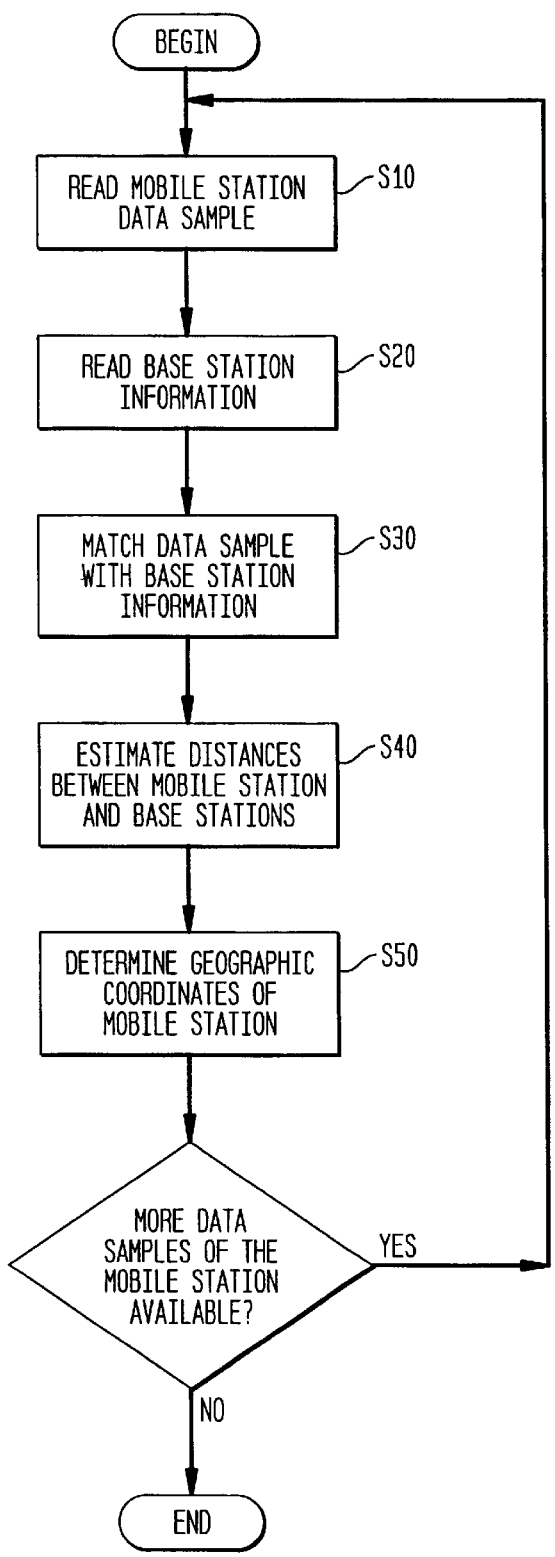
FIG. 4 illustrates a flowchart of a preferred embodiment of the LPS.

FIG. 4 illustrates a flowchart of LPS for locating the mobile station M in a preferred embodiment. At step S10, the LPS 1 reads in data samples (for example, sector number, pilot phase and strength of the pilot channel signal) from the mobile station M. At step S20, the LPS 1 reads in a cell site table which includes information such as the base station ID, sector numbers of the base stations, and the base stations' geographic location measured in, for example, latitude and longitude. At step S30, the sector numbers of the data samples are matched with those in the cell site table to determine from where the pilot channel signals originated. If the pilot channel signals are from at least three base stations, then the triangle $b_1b_2b_3$ is formed, as shown in FIG. 1 or 2, and the distances between the mobile station M and the base stations $b_1$, $b_2$ and $b_3$ and the geolocation of the mobile station M can be determined.

The distances between mobile station M and the visible base stations $b_1$, $b_2$ and $b_3$ are estimated at step S40. The computer 10 calculates for distance $d_1$ such that a set of cost functions for distance errors are minimized and determines distances $d_2$ and $d_3$ based on the estimated distance $d_1$. The estimation of distance $d_1$ and the determination of distances $d_2$ and $d_3$ based on distance $d_1$ will be described below.

The LPS determines the geographic coordinates of mobile station M at S50 using TDOA. The LPS 1 calculates the local coordinates of the mobile station M, i.e., $(x_0, y_0)$ in relation to the serving base station $b_1$, and converts the local coordinates $(x_0, y_0)$ to global latitude and longitude based on the known latitudes and longitudes of the base stations $b_1$, $b_2$ and $b_3$. When succeeding pilot channel signal phase measurements and recordings exist, the geolocation of the mobile station M can be re-estimated and averaged to provide an even more accurate analysis.

Step S40—Estimating Distances Between the Mobile Station and the Base Stations

The two most critical system measurement errors in a TDOA approach are rounding errors in the pilot channel signal phase measurement and synchronization errors among base stations. For the pilot channel signal phase measurement, if one chip corresponds to 800.4 feet, then the rounding error (worst case half a chip) contributes to 400.2 feet in deviation of location. The rounding error can be represented by random variable $T_1$ when satisfying a uniform distribution.

Ideally, each base station is time synchronized with the other base stations. Each base station could also be time synchronized using a GPS clock. However, the actual clocks in the base stations tend to drift around a nominal value. The drifting error can be represented as a random variable $T_2$, satisfying another uniform distribution. The influence of the error sources can be added to equal system measurement error T, which is the sum of random variables $T_1$ plus $T_2$. Accordingly, a measured pilot channel signal phase $p_i$ is equal to a true pilot channel signal phase plus a system measurement error T.

TDOA works best if the measurements being used are those belonging to line-of-sight (LOS) signals because a straight line is the shortest line between two points. Unfortunately, it is not always possible for the mobile station M to receive LOS signals from the base stations $b_1$, $b_2$ and $b_3$. A single signal transmitted from any of the base stations $b_1$, $b_2$ and $b_3$ may reflect off different objects such as buildings, trees and vehicles before it reaches the mobile station M, and therefore take a longer path than if the signal were a LOS signal. This multi-path effect causes a delay in the arrival of the signal and detrimentally affects the TDOA estimate.

Since there is no guarantee that a mobile station M will acquire line-of-sight (LOS) signals from the visible base stations $b_1$, $b_2$ and $b_3$, the delay in arrival time caused by a multi-path signal must be accounted for when using TDOA to determine the distance between the mobile station M and the base stations $b_1$, $b_2$ and $b_3$. However, the amount of delay differs depending on the distance and the objects located between the mobile station M and the base stations $b_1$, $b_2$ and $b_3$ and is therefore very difficult to model. Accordingly, a single multi-path parameter $\mu$ represents the proportional time delay caused by the multi-path effect and is modeled as a non-random parameter instead of a random number because the single multi-path parameter $\mu$ must be estimated for all pilot channel signals. Multi-path parameter $\mu$ is generally less than 1, and would equal its maximum of 1 if the mobile station M only acquired LOS signals from the visible base stations $b_1$, $b_2$ and $b_3$.

It should be noted that one single multi-path parameter $\mu$ is assumed which implies a homogenous multi-path effect. That is, the delay caused by the multi-path effect is assumed to be the same for each pilot channel signal even though the multi-path effect on the pilot channel signal from each of the base stations $b_1$, $b_2$ and $b_3$ is different. A multi-path parameter $\mu$ that represent a uniform extra delay can substantially alleviate the multi-path effect. The multi-path parameter $\mu$ may be varied in a certain range defined by a model associated with typical environments such as rural, urban, suburban, highway, etc.

Mobile station M does not know the exact time (as synchronized with GPS) that the base station $b_i$ transmits a pilot channel signal nor the exact time that the mobile station M receives the pilot channel signal in order to determine the time that it takes for the pilot channel signal to travel from the base station $b_i$ to the mobile station M. Therefore the distances $d_1$, $d_2$ and $d_3$ between the base stations $b_i$ and the mobile station M are unknown.

However, the base stations are synchronized with each other, and the mobile station M is synchronized with the serving base station $b_1$. Thus the mobile station M can record chip offsets of pilot channel signal phases emitted from remote base stations $b_2$ and $b_3$ in relation to the pilot channel signal of the serving base station $b_1$. Therefore, the mobile M can determine the additional time—after receipt of the pilot channel signal from the serving base station $b_1$—required for the pilot channel signals to travel from the remote base stations $b_2$ and $b_3$ to the mobile station M because the phase of the remote base stations $b_2$ and $b_3$ are measurable in relation to the phase of the serving base station $b_1$, which is set to zero due to the synchronization of the mobile station M with the base station $b_1$. The mobile station M identifies a pilot channel signal phase $p_2$ as a phase difference between the pilot channel signal phase recordings of base stations $b_1$ and $b_2$, and identifies a pilot channel signal phase $p_3$ as a phase difference between the pilot channel signal phase recordings of base stations $b_1$ and $b_3$. Accordingly, distance $d_2$ equals distance $d_1$ plus 800.4 feet times the pilot channel signal phase $p_2$, or $$d_2 = d_1 + 800.4(p_2) \text{ft} \quad (4)$$

Similarly, distance $d_3$ equals distance $d_1$ plus 800.4 feet times the pilot channel signal phase $p_3$, or $$d_3 = d_1 + 800.4(p_3) \text{ft} \quad (5)$$

However, distance $d_1$ must be estimated before distances $d_2$ and $d_3$ can be determined.

Consequently, the LPS 1 estimates distance $d_1$. To search for an estimate for distance $d_1$, the following equations (6)–(8) are cost functions that are minimized for distance errors $F_{12}$, $F_{13}$, and $F_{23}$:

$$F_{12} = (b_1 b_2)^2 - \mu^2 d_1^2 - \mu^2 d_2^2 + 2\mu^2 (d_1)(d_2) \cos \alpha_{12}, \quad (6)$$

$$F_{13} = (b_1 b_3)^2 - \mu^2 d_1^2 - \mu^2 d_3^2 + 2\mu^2 (d_1)(d_3) \cos \alpha_{13}, \quad (7)$$

$$F_{23} = (b_2 b_3)^2 - \mu^2 d_2^2 - \mu^2 d_3^2 + 2\mu^2 (d_2)(d_3) \cos \alpha_{23}, \quad (8)$$

for distance $d_1$, multi-path parameter $\mu$ and angles $\alpha$, and substituting for distances $d_2$ and $d_3$ based on equations (4) and (5). The cost functions for distance errors $F_{12}$, $F_{13}$ and $F_{23}$ must be minimized to arrive at the best estimate for distance $d_1$.

The minimization of cost functions $F_{12}$, $F_{13}$, and $F_{23}$ can be accomplished using well known minimization approaches, such as by steepest decent or incremental search with respect to $d_1$. For example, using an incremental search approach, the above cost functions can be minimized by estimating a range for the distance $d_1$ and the multi-path parameter $\mu$, solving the equations (6)–(8) for each predetermined increment in the ranges, and selecting the distance $d_1$, multi-path parameter $\mu$ and angles $\alpha_{12}$, $\alpha_{13}$ and $\alpha_{23}$ that provide the distance errors $F_{12}$, $F_{13}$ and $F_{23}$ closest to zero. After distance $d_1$ is estimated, distances $d_2$ and $d_3$ can be determined using equations (4) and (5).

Equations (6)–(8) have four unknown values, namely distance $d_1$, the multi-path parameter $\mu$, and angles $\alpha_{12}$ and $\alpha_{13}$. As discussed above, angle $\alpha_{23}$ is equal to 360 degrees minus angles $\alpha_{12}$ and $\alpha_{13}$ when the mobile station M is located inside triangle $b_1 b_2 b_3$. Angle $\alpha_{23}$ is equal to angles $\alpha_{12}$ plus $\alpha_{13}$ when mobile station M is located outside triangle $b_1 b_2 b_3$. However, the angles $\alpha_{12}$ and $\alpha_{13}$ are determined based on the estimated distance $d_1$, in other words the values of the angles $\alpha_{12}$ and $\alpha_{13}$ are determined according the value of distance $d_1$.

A skilled practitioner would readily understand that the CDMA (and TDMA) systems can measure a round trip delay of a pilot channel signal emitted from the serving base station $b_1$ to the mobile station M and back to the serving base station $b_1$. This round trip delay provides the benefit of allowing the LPS 1 to use a more narrow scope for estimating the range of distance $d_1$.

Step S50—Determining the Geolocation of the Mobile Station

After distances $d_1$, $d_2$ and $d_3$ are estimated, then the mobile station M Cartesian coordinates ($x_0$, $y_0$) can be estimated by minimizing equations (9)–(11) for cost functions $G_1$, $G_2$ and $G_3$:

$$G_1 = \mu^2(d_1)^2 - [(x_1-x_0)^2 + (y_1-y_0)^2], \quad (9)$$

$$G_2 = \mu^2(d_2)^2 - [(x_2-x_0)^2 + (y_2-y_0)^2], \quad (10)$$

$$G_3 = \mu^2(d_3)^2 - [(x_3-x_0)^2 + (y_3-y_0)^2] \quad (11)$$

where $G_i$, i=1, 2, and 3 represents the position error and is zero in an ideal case. However, since distances $d_1$, $d_2$ and $d_3$ are estimated, equations (7–9) will not be solved exactly, but the best estimate of $(x_0, y_0)$ can be found by minimizing $G_i$.

Example Estimation and Coordinate Conversion

The mobile station M is synchronized with the base stations. Consequently, in the mobile station M reply message that is sent back to base station $b_1$, the phase shift of the reference pilot channel signal transmitted by base station $b_1$ is set to zero. The pilot channel signal phases from base stations $b_2$ and $b_3$ are recorded in chip off-sets from the zero phase shift of base station $b_1$. Accordingly, once distance $d_1$ is estimated, distances $d_2$ and $d_3$ can be determined directly as discussed above.

In accordance with steps S10 and S20 of FIG. 4, the LPS 1 gathers input information including mobile station M information and base station $b_1$, $b_2$ and $b_3$ information. For example, the mobile station M records pilot channel signals emitted from base station $b_1$ with a base station identifying pilot PN of 432 and a pilot channel signal strength of 17 (−8.5 dB); from base station $b_2$ with a base station identifying pilot PN of 76, a pilot channel signal phase $p_2$ equal to 4 PN chips, and a pilot channel signal strength of 21 (−10.5 dB); and from base station $b_3$ with a base station identifying pilot PN of 220, a pilot channel signal phase $p_2$ equal to 3 PN chips, and a pilot channel signal strength of 19 (−9.5 dB). In accordance with step S30 of FIG. 4, the pilot PNs that are reported by the mobile station M are matched with pilot PNs in the sector information stored in a cell site table to determine from which base stations $b_1$, $b_2$ and $b_3$ the pilot channel signals were sent. Here, base station $b_1$ is cell number 138, transmitting a pilot PN of 432 and is located at latitude 40.861389 and longitude −73.864167; base station $b_2$ is cell number 140, transmitting a pilot PN of 76 and is located at latitude 40.867500 and longitude −73.884722; and base station $b_3$ is cell number 43, transmitting a pilot PN of 220 and is located at latitude 40.878889 and longitude −73.871389.

The base station latitudes and longitudes are converted into a local coordinate system (x,y). Base station $b_1$'s coordinates (0,0) are set as the origin, base station $b_2$'s coordinates $(x_2,0)$ are set to be on the x-axis, and base station $b_3$'s coordinates $(X_3, y_3)$ are determined from the known distances among the base stations.

In accordance with step S40 of FIG. 4, cost function equations (6)–(8) are then minimized to estimate that distance $d_1$=0.801 miles, multi-path parameter $\mu$=0.98, angle $\alpha_{12}$=1.784084 radians, angle $\alpha_{13}$=3.002281 radians and angle $\alpha_{23}$=1.218859 radians. Based on estimated distance $d_1$, distances $d_2$ and $d_3$ are determined directly as described above to equal 0.983620 miles and 0.839603 miles, respectively. In accordance with step S50 of FIG. 4, equations (9)–(11) are then minimized to determine that the local Cartesian coordinates $(x_0, y_0)$ equal (0.237018, 0.357580). These coordinates can be converted back to latitude and longitude so that the mobile station M's location can be more easily marked on a map to show which street it is located. In this example, the local Cartesian coordinates (0.237018, 0.357580) of the mobile station M's geographic location are converted to latitude 40.867465 and longitude −73.865885.

In the above example, angle $\alpha_{13}$ is equal to angle $\alpha_{12}$ plus angle $\alpha_{23}$. Therefore the mobile station M is not located within triangle $b_1b_2b_3$, but instead is located outside of length $b_1b_3$.

Distance Deviation of Estimates

Figure 5:
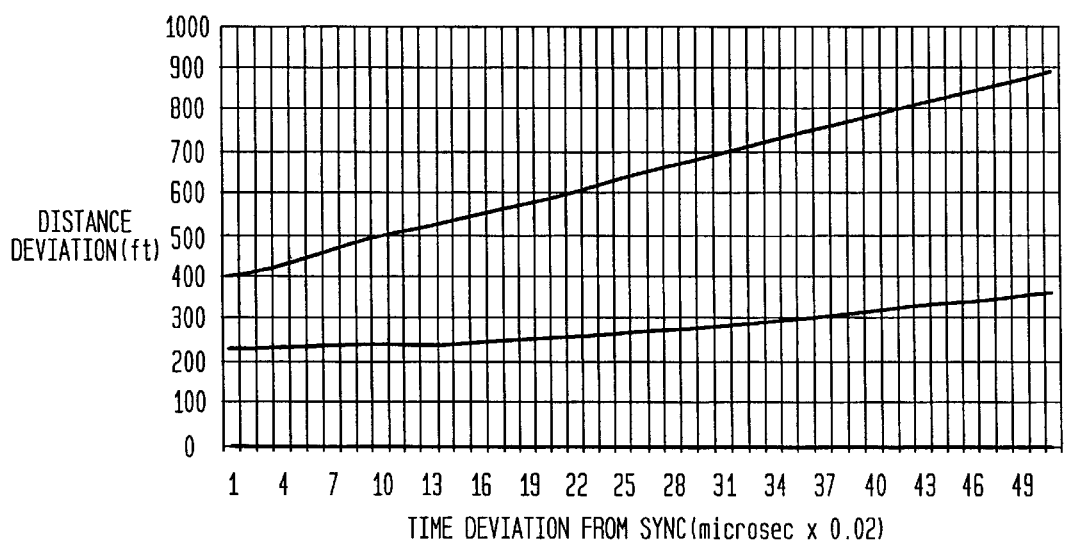
FIG. 5 is a chart illustrating an example performance analysis of the LPS.

The lower line in FIG. 5 shows an example of distance deviation (ft) between the true location and LPS estimated location of mobile station M based on the time deviation ($\mu$s) caused by system measurement errors, including rounding errors in the pilot channel signal phase measurement and synchronization errors. The upper line represents the maximum error for performance over a snapshot of time. If a snapshot is extended over time and the distance deviations are averaged, the distance deviation would become the lower mean error line. Accordingly, if the base stations are synchronized, the rounding error in pilot channel signal phase measurement alone approaches 200 feet.

Reverse Link Triangulation (RLT)

In North American TDMA systems, the time arrival is obtained at the base stations rather than at the mobile stations. The mobile station transmits a coded digital verification color code (CDVCC) signal as the identity of the mobile station. Upon receiving the CDVCC signal, the receiving base station time stamps the time of receiving the CDVCC signal. If the base stations are synchronized, then the base stations determine the relative time differences between arrival of the CDVCC signals by subtracting the time of the receipt of the signal at the first base station from the time of the later received signals at other base stations. Accordingly, the LPS is applicable to both CDMA and TDMA systems.

Therefore, equations (6)–(11) can also be applied to TDMA RLT geolocation systems if the clock signals or base stations involved in locating a particular mobile station are synchronized. The synchronization could be done by installation of GPS. Reverse link signals are transmitted from mobile stations to base stations through the reverse link, which is generally a different frequency band than the forward link of CDMA systems, but in a same frequency band and different time slots for TDMA systems.

A TDMA reverse link would provide the benefits of better location accuracy if the time arrival is measured at the base stations because there would be no chip-rounding error as in a CDMA forward link. In addition, the power control in TDMA is not as stringent as in CDMA, therefore making it easier for several base station to "see" signals from the mobile. Inputs needed by TDMA reverse link triangulation include the identity of the mobile requesting location service, the relative time arrivals at the base stations, location (latitude/longitude) of all base stations, and the round-trip delay (measured continuously in TDMA for time alignment purposes). The strength of signal from the mobile station is also desired and can be measured at neighboring base stations for assistance of handoff.

While this invention has been described in conjunction with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A method for determining the position of a mobile station, comprising the steps of:
   (a) receiving pilot channel signal information indicating arrival times of pilot channel signals at the mobile station;

[b] estimating a distance from the mobile station to one of a plurality of base stations by minimizing a set of distance error cost functions including angles formed by the base stations and the mobile station; and

[c] estimating the location of the mobile station by minimizing a set of position error cost functions based on the pilot channel signal information and on base station information indicating the location of the plurality of base stations to which the arrival time information is associated.

2. The method of claim 1, wherein the position error cost functions are derived from the equations:

$$G_1 = \mu^2(d_1)^2 - [(x_1-x_0)^2 + (y_1-y_0)^2],$$
$$G_2 = \mu^2(d_2)^2 - [(x_2-x_0)^2 + (y_2-y_0)^2],$$
$$G_3 = \mu^2(d_3)^2 - [(x_3-x_0)^2 + (y_3-y_0)^2]$$

where $\mu$ is a multi-path effect parameter, $d_1$ is a distance from the mobile station to a first base station, $d_2$ is a distance from the mobile station to a second base station, $d_3$ is a distance from the mobile station to a third base station, $(x_0,y_0)$ are the local Cartesian coordinates of the mobile station, $(x_1,y_1)$ are the local Cartesian coordinates of the first base station, $(X_2,y_2)$ are the local Cartesian coordinates of the second base station, and $(x_3,y_3)$ are the local Cartesian coordinates of the third base station.

3. The method of claim 2, wherein $d_2 = d_1 + 800.4(p_2)$ft, where $p_2$ is a phase difference between the pilot channel signal phase recordings of the first and second base stations, and $d_3 = d_1 + 800.4(p_3)$ft, where $p_3$ is a phase difference between the pilot channel signal phase recordings of the first and third base stations.

4. The method of claim 1, prior to step [c], further comprising the steps of:

[d] receiving the base station information indicating the location of the plurality of base stations; and

[e] matching the pilot channel signal information to the base station information based on a source identifier common to both the pilot channel signal information and the base station information.

5. The method of claim 1, wherein the arrival times correspond to synchronized timing of the base stations.

6. The method of claim 1, wherein the distance error cost functions are derived from the equations:

$$F_{12} = (b_1 b_2)^2 - \mu^2 d_1^2 - \mu^2 d_2^2 + 2\mu^2(d_1)(d_2)\cos\alpha_{12},$$
$$F_{13} = (b_1 b_3)^2 - \mu^2 d_1^2 - \mu^2 d_3^2 + 2\mu^2(d_1)(d_3)\cos\alpha_{13},$$
$$F_{23} = (b_2 b_3)^2 - \mu^2 d_2^2 - \mu^2 d_3^2 + 2\mu^2(d_2)(d_3)\cos\alpha_{23},$$

where $b_1 b_2$ is a distance from a first base station to a second base station, $b_1 b_3$ is a distance from the first base station to a third base station, $b_2 b_3$ is a distance from the second base station to the third base station, $\mu$ is a multi-path effect parameter, $d_1$ is a distance from the mobile station to the first base station, $d_2$ is a distance from the mobile station to the second base station, $d_3$ is a distance from the mobile station to the third base station, $\alpha_{12}$ denotes the angle formed by lines between the mobile station and a first and second base stations, $\alpha_{13}$ denotes the angle formed by lines between the mobile station and the first and a third base stations, and $\alpha_{23}$ denotes the angle formed by lines between the mobile station and the second and third base stations.

7. The method of claim 1, wherein the pilot channel signal information includes at least one of a source identifier, a pilot channel signal phase and a pilot strength.

8. The method of claim 7, wherein the base station information includes at least one of the source identifier and base station location.

9. The method of claim 1, further comprising the step of averaging the estimation of the mobile station location with a previous estimation of the mobile station to acquire a mean estimation of mobile station location.

10. The method of claim 1, wherein the pilot channel signal information is included in a CDMA signal.

11. The method of claim 1, wherein the pilot channel signal information is included in a TDMA signal.

12. A local positioning system implemented on a computer for determining the position of a mobile station, comprising:

means for receiving pilot channel signal information indicating arrival times of pilot channel signals at the mobile station;

means for estimating a distance from the mobile station to one of a plurality of base stations by minimizing a set of distance error cost functions including angles formed by the base stations and the mobile station; and means for estimating the location of the mobile station by minimizing a set of position error cost functions based on the pilot channel signal information and on base station information indicating the location of the plurality of base stations to which the arrival time information is associated.

13. The local positioning system of claim 12, wherein the position error cost functions are derived from the equations:

$$G_1 = \mu^2(d_1)^2 - [(x_1-x_0)^2 + (y_1-y_0)^2],$$
$$G_2 = \mu^2(d_2)^2 - [(x_2-x_0)^2 + (y_2-y_0)^2],$$
$$G_3 = \mu^2(d_3)^2 - [(x_3-x_0)^2 + (y_3-y_0)^2]$$

where $\mu$ is a multi-path effect parameter, $d_1$ is a distance from the mobile station to a first base station, $d_2$ is a distance from the mobile station to a second base station, $d_3$ is a distance from the mobile station to a third base station, $(x_0,y_0)$ are the local Cartesian coordinates of the mobile station, $(x_1,y_1)$ are the local Cartesian coordinates of the first base station, $(x_2,y_2)$ are the local Cartesian coordinates of the second base station, and $(x_3,y_3)$ are the local Cartesian coordinates of the third base station.

14. The local positioning system of claim 13, wherein $d_2 = d_1 + 800.4(p_2)$ft, where $p_2$ is a phase difference between the pilot channel signal phase recordings of the first and second base stations, and $d_3 = d_1 + 800.4(p_3)$ft, where $p_3$ is a phase difference between the pilot channel signal phase recordings of the first and third base stations.

15. The local positioning system of claim 12, further comprising:

means for receiving the base station information indicating the location of the plurality of base stations; and means for matching the pilot channel signal information to the base station information based on a source identifier common to both the pilot channel signal information and the base station information.

16. The local positioning system of claim 12, wherein the arrival times correspond to synchronized timing of the base stations.

17. The local positioning system of claim 12, wherein the distance error cost functions are derived from the equations:

$$F_{12}=(b_1b_2)^2-\mu^2d_1^2-\mu^2d_2^2+2\mu^2(d_1)(d_2)\cos\alpha_{12},$$

$$F_{13}=(b_1b_3)^2-\mu^2d_1^2-\mu^2d_3^2+2\mu^2(d_1)(d_3)\cos\alpha_{13},$$

$$F_{23}=(b_2b_3)^2-\mu^2d_2^2-\mu^2d_3^2+2\mu^2(d_2)(d_3)\cos\alpha_{23},$$

where $b_1b_2$ is a distance from a first base station to a second base station, $b_1b_3$ is a distance from the first base station to a third base station, $b_2b_3$ is a distance from the second base station to the third base station, $\mu$ is a multi-path effect parameter, $d_1$ is a distance from the mobile station to the first base station, $d_2$ is a distance from the mobile station to the second base station, $d_3$ is a distance from the mobile station to the third base station, $\alpha_{12}$ denotes the angle formed by lines between the mobile station and a first and second base stations, $\alpha_{13}$ denotes the angle formed by lines between the mobile station and the first and a third base stations, and $\alpha_{23}$ denotes the angle formed by lines between the mobile station and the second and third base stations.

18. The local positioning system of claim 12, wherein the pilot channel signal information includes at least one of a source identifier, a pilot channel signal phase and a pilot strength.

19. The local positioning system of claim 18, wherein the base station information includes at least one of the source identifier and base station location.

20. The local positioning system of claim 12, further comprising means for averaging th e estimation of the mobile station location with a previous estimation of the mobile station to acquire a mean estimation of mobile station location.

21. The local positioning system of claim 12, wherein the pilot channel signal information is included in a CDMA signal.

22. The local positioning system of claim 12, wherein the pilot channel signal information is included in a TDMA signal.

23. An executable program embodied on a computer-readable medium for determining the position of a mobile station comprising:

a receiving source code segment for receiving pilot channel signal information indicating arrival times of pilot channel signals at the mobile station;

a computing source code segment for estimating a distance from the mobile station to one of a plurality of base stations by minimizing a set of distance error cost functions including angles formed by the base stations and the mobile station; and an estimating source code segment for estimating the location of the mobile station by minimizing a set of position error cost functions based on the pilot channel signal information and on base station information indicating the location of a the plurality of base stations to which the arrival time information is associated.

24. A computer data signal comprising:

a receiving signal segment for receiving pilot channel signal information indicating arrival times of pilot channel signals at the mobile station;

a computing signal segment for estimating a distance from the mobile station to one of a plurality of base stations by minimizing a set of distance error cost functions including angles formed by the base stations and the mobile station; and an estimating signal segment for estimating the location of the mobile station by minimizing a set of position error cost functions based on the pilot channel signal information and on base station information indicating the location of the plurality of base stations to which the arrival time information is associated.

25. The computer data signal of claim 24, wherein the computer data signal is embodied on a carrier wave.

* * * * *